United States Patent [19]

Oversluizen et al.

[11] Patent Number: 4,814,105

[45] Date of Patent: Mar. 21, 1989

[54] METHOD OF PREPARING A LUMINESCENT QUARTZ GLASS ACTIVATED BY BIVALENT EUROPIUM, LUMINESCENT QUARTZ GLASS OBTAINED BY SUCH A METHOD AND LUMINESCENT SCREEN PROVIDED WITH SUCH A LUMINESCENT QUARTZ GLASS

[75] Inventors: Gerrit Oversluizen; Emmanuel Papanikolau; Gijsbertus A. C. M. Spierings, all of Eindhoven, Netherlands

[73] Assignee: U.S. Philips Corporation, New York, N.Y.

[21] Appl. No.: 105,923

[22] Filed: Oct. 7, 1987

[30] Foreign Application Priority Data

Oct. 8, 1986 [NL] Netherlands .................. 8602520

[51] Int. Cl.$^4$ .................. C03C 3/06; C03C 3/095; C09K 11/08
[52] U.S. Cl. .................. 252/301.4 F; 501/54; 501/64; 428/426; 428/432
[58] Field of Search .................. 501/54, 64; 252/301.4 F; 428/426, 432

[56] References Cited

U.S. PATENT DOCUMENTS

| | | | |
|---|---|---|---|
| 3,527,711 | 9/1970 | Barber et al. | 501/54 |
| 4,336,048 | 6/1982 | van der Steen et al. | 501/54 |
| 4,361,779 | 11/1982 | van der Steen et al. | 501/54 |

OTHER PUBLICATIONS

J. Electrochem. Soc., vol. 107, No. 5 (1970), pp. 708–711.

*Primary Examiner*—Mark L. Bell
*Attorney, Agent, or Firm*—John C. Fox

[57] ABSTRACT

Method of preparing an aluminum oxide containing quartz glass activated by bivalent europium and comprising as glass matrix oxides mainly $SiO_2$ and furthermore per mol of $SiO_2$ up to at most 0.15 mol of at least one of the oxides, $Al_2O_3$, $B_2O_3$, $P_2O_5$, $ZrO_2$, $Scf_2O_3$, $Y_2O_3$, $La_2O_3$, $Gd_2O_3$, $Lu_2O_3$, the alkali metal oxides and the alkaline earth metal oxides. A mixture is made of the composite oxides or of compounds which yield these oxides. The mixture comprises europium in the form of an aluminum containing compound of bivalent europium. The mixture is melted at a high temperature in a reducing atmosphere and is then cooled. The luminescent quartz glasses obtained are used in luminescent screens of, for example, low-pressure mercury vapor discharge lamps.

7 Claims, No Drawings

METHOD OF PREPARING A LUMINESCENT QUARTZ GLASS ACTIVATED BY BIVALENT EUROPIUM, LUMINESCENT QUARTZ GLASS OBTAINED BY SUCH A METHOD AND LUMINESCENT SCREEN PROVIDED WITH SUCH A LUMINESCENT QUARTZ GLASS

CROSS-REFERENCE TO RELATED APPLICATIONS

U.S. patent application Ser. Nos. 105,921 and 105,922, having Attorney's Docket Nos. PHN 11,892 and PHN 11,893, respectively, both filed simultaneously herewith, relate to luminescent alumino-silicate and alumino-borate glasses, and to luminescent quartz glasses prepared from a solgel, respectively.

BACKGROUND OF THE INVENTION

The invention relates to a method of preparing an aluminium oxide-containing quartz glass activated by bivalent europium in which a glass matrix oxide mainly comprises $SiO_2$ and furthermore per mol of $SiO_2$ up to at most 0.15 mol of MO, in which MO represents at least one of the oxides $Al_2O_3$, $B_2O_3$, $P_2O_5$, $ZrO_2$, $Sc_2O_3$, $Y_2O_3$, $La_2O_3$, $Gd_2O_3$, $Lu_2O_3$, the alkali metal oxides and the alkaline earth metal oxides.

A luminescent quartz glass activated by bivalent europium is known from a publication in J. Electrochem. Soc., Vol. 117, no. 5 (1970), 708–711. In this article the starting material is a glass having a very high $SiO_2$ content (at least 96% by weight) which is activated by impregnating the glass with an aqueous solution of a salt of trivalent europium, notably $Eu(NO_3)_3$ whereafter the glass is heated at a high temperature. This heat treatment is performed in a reducing atmosphere in order to bring the europium into the desired bivalent state and to incorporate it into the glass matrix in that state. The publication also states that luminescence is only obtained with these glasses if trivalent aluminium is also present in the glass matrix. Therefore the starting material is not only impregnated with a solution of a europium salt but also with an aqueous solution of an aluminium compound, notably $Al(NO_3)_3$.

A drawback of the known method is that in many cases materials are obtained with a comparatively low luminous flux which are not suitable for practical uses. In fact, it has been found that the glasses, particularly at Eu concentrations above the relatively low value of 0.5 mol.%, often exhibit a yellow colour which implies that the reduction of the europium is not complete and that the degree of reduction is not satisfactorily reproducible.

The object of the invention is to provide a method of preparing luminescent quartz glasses activated by bivalent europium, which exhibit high luminescence efficiencies in a reproducible manner.

SUMMARY OF THE INVENTION

According to the invention a method of the type described in the opening paragraph is therefore characterized in that a mixture is made of the composite oxides or of compounds which yield these oxides at elevated temperatures, which mixture comprises europium in the form of an aluminium-containing compound of bivalent europium, and in that the mixture is melted at a high temperature in a reducing atmosphere and is subsequently cooled.

In the method according to the invention, the mixture of the composite oxides mainly comprises $SiO_2$ in order to obtain a luminescent quartz glass. The glass matrix, that is to say, the glass composition without the europium used as an activator, may furthermore comprise up to 0.15 mol per mol of $SiO_2$ MO, in which MO represents at least one of the oxides $Al_2O_3$, $B_2O_3$, $P_2O_5$, $ZrO_2$, $Sc_2O_3$, $Y_2O_3$, $La_2O_3$, $Gd_2O_3$, $Lu_2O_3$, the alkali metal oxides and the alkaline earth metal oxides. In this description and the claims, alkali metals are understood to be the elements Li, Na, K, Rb and Cs and the alkaline earth metals are understood to be the elements Mg, Ca, Sr, Ba and Zn. The use of one or more oxides MO may have the advantage that the glass formation proceeds more easily and can be performed notably at a lower temperature. In the formed glass, the said oxides MO as well as the mainly present $SiO_2$ are transparent both to excitation radiation and to emitted luminescent radiation. This is a requirement for obtaining a high luminescence efficiency, as is a high degree of purity of the glass.

According to the invention the europium is added to the mixture in the form of an aluminum-containing compound of bivalent europium. It has been found that in this manner, after melting the mixture at a high temperature in a reducing atmosphere and subsequent cooling, luminescent quartz glasses are obtained in which the europium is substantially completely present in the bivalent state. Quartz glasses having very high luminescence efficiencies are obtained in a satisfactorily reproducible manner by the method of the invention. Upon excitation by short-wave ultraviolet radiation (254 nm) quantum efficiencies of the order of 80% are found to be possible.

In addition, higher Eu concentrations can be used than in the case of the known method so that materials having a very strong absorption of the excitation energy can be obtained, which is very advantageous for practical uses.

In the case of cathode ray excitation, very high energy conversion efficiencies (for example 8%) are achieved with the quartz glasses obtained according to the invention. The said luminescence efficiencies are comparable to those of the crystalline luminescent materials hitherto frequently used.

The emission of the luminescent quartz glasses according to the invention consists of a band in the blue part of the spectrum ($Eu^{2+}$ emission). Dependent on the Eu concentration the maximum of this emission band is in the range of approximately 420 nm (with low Eu contents). to approximately 470 nm (with high Eu contents). The half-value width of the emission band is 80 to 100 nm.

The europium is preferably added in a quantity of 0.1 to 7.5 mol.% calculated with respect to the glass matrix oxides. In fact, for Eu concentrations of less than 0.1 mol.% the absorption of the excitation energy is too small so that too low luminous fluxes are obtained. The Eu concentration is preferably chosen to be not higher than 7.5 mol.% because at higher values too small luminous fluxes are achieved due to so-called concentration quenching.

All europium compounds are principally usable provided that these compounds contain aluminium and the europium is present in a bivalent state. The oxides other than EuO and $Al_2O_3$ possibly introduced into the quartz glass by means of this compound are transparent and are counted in the MO content of the glass matrix. The use of aluminates or aluminosilicates of bivalent europium is found to be particularly advantageous. In these compounds the molar ratio between Al and Eu is generally larger than 1, which is found to have a favourable effect on the luminescent quartz glass obtained. The use of $EuAl_2Si_2O_8$ or $EuAl_{12}O_{19}$ are especially preferred because then the best results are obtained.

The invention also relates to the luminescent quartz glasses activated by bivalent europium which are obtained by the above method. Due to their high quantum efficiencies they can be used instead of crystalline luminescent materials.

The luminscent quartz glasses according to the invention are preferably used in a luminescent screen which has a luminescent layer provided on a support. Such luminescent screens are used in, for example, cathode ray tubes and discharge lamps such as low-pressure mercury vapour discharge lamps.

DESCRIPTION OF THE PREFERRED EMBODIMENTS

A number of embodiments of the method according to the invention will now be described in greater detail.

EXAMPLES 1 TO 4

A mixture was made of 1 mol of $SiO_2$ and x mol % of $EuAl_2Si_2O_8$. In the examples 1 to 4, x had the values of 0.15, 0.34, 1 and 3, respectively. This mixture was heated to 2200° C. in a molybdenum crucible in a high-frequency furnace. The molten mixture was maintained at this temperature for ½ hour. During the heat treatment a reducing gas (He with 10% by vol. of $H_2$) was passed through the furnace. Subsequently the melt was allowed to cool down. The glass obtained was broken and ground and it was then ready for use. The following Table states for each example the results of the measurement of quantum efficiency q (in %) upon excitation by 254 nm radiation and of absorption A (in %) of the exciting radiation. Furthermore the Table states the location ($\lambda_{max}$ in nm) of the maximum of the emission band of these quartz glasses.

| Example | x(mol %) | q(%) | A(%) | $\lambda_{max}$(nm) |
|---|---|---|---|---|
| 1 | 0.15 | 88 | 67 | 436 |
| 2* | 0.34 | 91 | 85 | 444 |
| 3 | 1 | 83 | 91 | 459 |
| 4 | 3 | 71 | 94 | 469 |

* a conversion efficiency of 8% was measured for this glass upon excitatin by cathode rays.

EXAMPLES 5 TO 8

The method was carried out in an analogous manner to that described in the examples 1 to 4. However, $EuAl_{12}O_{19}$ was used as the aluminium-containing compound of bivalent europium and x had the values of 0.15, 0.34, 1 and 1.5, respectively. The Table below shows the measured results with respect to q, A and $\lambda_{max}$ for these quartz glasses.

| Example | x(mol %) | q(%) | A(%) | $\lambda_{max}$(nm) |
|---|---|---|---|---|
| 5 | 0.15 | 82 | 72 | 424 |
| 6 | 0.34 | 87 | 77 | 433 |
| 7 | 1 | 78 | 88 | 441 |
| 8 | 1.5 | 79 | 93 | 444 |

What is claimed is:

1. A method of preparing an aluminum oxide-containing quartz glass activated by bivalent europium, which glass comprises as a glass matrix oxide mainly $SiO_2$ and furthermore per mol of $SiO_2$ up to at most 0.15 mol of MO, in which MO represents at least one of the oxides $Al_2O_3$, $B_2O_3$, $P_2O_5$, $ZrO_2$, $Sc_2O_3$, $Y_2O_3$, $La_2O_3$, $Gd_2O_3$, $Lu_2O_3$, the alkali metal oxides and the alkaline earth metal oxides, characterized in that:

a mixture is made of the composite oxides or of compounds which yield these oxides at elevated temperatures, which mixture comprises europium in the form of an aluminum-containing compound of bivalent europium;

the mixture is melted at a high temperature in a reducing atmosphere;

and the melt is subsequently cooled.

2. A method as claimed in claim 1, characterized in that the europium is added in a quantity of 0.1 to 7.5 mol.% calculated with respect to the glass matrix oxides.

3. A method as claimed in claim 1, characterized in that the europium is added as an aluminate or aluminosilicate of bivalent europium.

4. A method as claimed in claim 3, characterized in that the europium is added as $EuAl_2Si_2O_8$.

5. A method as claimed in claim 3, characterized in that the europium is added as $EuAl_{12}O_{19}$.

6. A luminescent quartz glass activated by bivalent europium obtained by a method as claimed in claim 1.

7. A luminescent screen having a luminescent layer provided on a support, comprising a luminescent quartz glass activated by bivalent europium as claimed in claim 6.

* * * * *